United States Patent
Steinberg et al.

(10) Patent No.: US 7,328,218 B2
(45) Date of Patent: Feb. 5, 2008

(54) CONSTRAINED TREE STRUCTURE METHOD AND SYSTEM

(75) Inventors: Dan Steinberg, San Diego, CA (US); Scott Cardell, San Diego, CA (US)

(73) Assignee: Salford Systems, San Diego, CA (US)

( * ) Notice: Subject to any disclaimer, the term of this patent is extended or adjusted under 35 U.S.C. 154(b) by 389 days.

(21) Appl. No.: 11/088,256

(22) Filed: Mar. 22, 2005

(65) Prior Publication Data
US 2006/0218169 A1    Sep. 28, 2006

(51) Int. Cl.
*G06F 7/00*    (2006.01)
(52) U.S. Cl. ...................... 707/100; 707/101
(58) Field of Classification Search ............... 707/100, 707/101, 102, 200
See application file for complete search history.

(56) References Cited

U.S. PATENT DOCUMENTS 6,230,151 B1 * 5/2001 Agrawal et al. ............... 706/12
6,678,635 B2 * 1/2004 Tovinkere et al. ........... 702/179

* cited by examiner

*Primary Examiner*—Wilson Lee
(74) *Attorney, Agent, or Firm*—Gordon & Rees LLP

(57) ABSTRACT

The present invention provides a method and system for imposing constraints on the induction of decision trees to control where in the decision tree, and in what order specific attributes may be used as node splitters. The invention is used to force a decision tree to contain a specified attribute in one or more locations, or to require the construction of a decision tree in which nodes split using one group of attributes always appear above or always appear below nodes using another group of attributes. This constrained tree is grown and optionally pruned in the same way that a prior art tree is grown and optionally pruned, subject only to the constraints imposed by the method of the present invention.

20 Claims, 8 Drawing Sheets

| RECORD | TARGET | HANDPRIC | USERPRICE | AGE | EDUCATN | CITY | TELEBILC |
|---|---|---|---|---|---|---|---|
| 1 | YES | 150 | .10 | 25 | 11 | AA | 55 |
| 2 | NO | 50 | .50 | 45 | 16 | BB | 17 |
| 3 | YES | 75 | .30 | 42 | 13 | AA | 22 |
| : | NO | 125 | 1.00 | 27 | 12 | AA | 15 |
| : | NO | 200 | .20 | 33 | 17 | BB | 27 |
| : | NO | 150 | .60 | 29 | 10 | CC | 110 |

FIGURE 3
PRIOR ART

CONSTRAINED TREE STRUCTURE METHOD AND SYSTEM

FIELD OF THE INVENTION

The present invention relates to data mining and more specifically to the building of classification and regression models using decision trees.

BACKGROUND OF THE INVENTION

Data mining encompasses a broad collection of computer intensive methods for discovering patterns in data for a variety of purposes, including classification, accurate prediction and gaining insight into a causal process. Typically, data mining requires historical data in the form of a table consisting of rows (also known as instances, records, cases, or observations) and columns (also known as attributes, variables or predictors). One of the attributes in the historical data is nominated as a "target" and the process of data mining allows the target to be predicted. A predictive model is created using data, often called the "training" or "learning" data.

From data mining, models which can be used to predict the target for new, unseen, or future data (i.e. data other than the training data) with satisfactory accuracy and models which assist decision makers and researchers understand the casual processes generating the target are created. When a database attribute records membership in a class, such as "good vs. bad" or "A vs. B vs. C", it is known as a nominal attribute, and when the objective of the data mining is to be able to predict this class (the "class label"), the activity is known as classification. When the target attribute of the data mining process records a quantity such as the monetary value of a default, or the amount charged to a credit card in a month, the modeling activity is called regression.

In banking, data mining classification models are used to learn the patterns which can help predict if an applicant for a loan is likely to default, make late payments, or repay the loan in full in a timely manner (default vs. slow pay vs. current), and regression trees are used to predict quantities such as the balances a credit card holder accumulates in a specified time period. In marketing, classification models are used to predict whether a household is likely to respond to an offer of a new product or service (responder vs. non-responder), and regression models are used to predict how much a person will spend in a specific product category. Models are learned from historical data, such as prior bank records where the target attribute has already been observed, and the model is then used to make predictions for new instances for which the value of the target has not yet been observed. To be able to support predictions based on the model, the new data must contain at least some of the same predictive attributes found in historical training data. Data can be applied to virtually any type of data once it has been appropriately organized, and data mining has been used extensively in credit risk analysis, database marketing, fraud detection in insurance claims, loan applications, and credit card transactions, pharmaceutical drug discovery, computer network intrusion detection, and fault analysis in manufacturing.

FIG. 1 illustrates a prior art process of the learning of a data mining model. In the first step, training data, including target attribute and potential predictor attributes, is organized 110. Once organized, the training data is provided to modeling algorithms for classification or regression 120. From the training data, the modeling algorithms produce one or more classifiers or predictive regression models 130. After the models have been produced, the models are then embedded in decision support systems 140 which are used to classify, predict, and help guide decisions. A typical use of the decision support system is illustrated in FIG. 2. Data records that do not contain values for the target attribute 210 are provided to the decision support system 220 to make predicted values for the target attribute 230. FIG. 3 illustrates an extract from a sample training data set (or table) appropriately organized for data mining. The original data used to create this table may have been stored in a different form in one of many database management systems.

Decision trees are one of the major data mining methods and they are prized for their interpretability and comprehensibility. Typically, decision trees are built by recursive partitioning which begins by incorporating the entire training data set into a starting or root node. Once incorporated, an attempt is made to partition this node into at least two mutually exclusive and collectively exhaustive sub-nodes (child nodes) using a single attribute X (the splitter), with the goals of separating instances with different target attribute values into different child nodes. A child node contains all instances corresponding to a given region of values of the splitter. A region is a layer, layers or parts of layers of a decision tree. For continuous attributes, such regions are contiguous and defined by upper and lower bounds, for example, $L<=X1<U$, which defines a region in which the attribute X1 is greater than or equal to L and strictly less than U. For nominal attributes the region is defined by a list of attribute values (for example, a region could be defined by $\{X2="AA"$ or $X2="BB"$ or $X2="CC"\}$). Typically, an exhaustive search is made over all possible ways in which an attribute can be used to split the node and each partition is evaluated using some goodness of split criterion, such the gini, entropy, or statistical measure such as an F-statistic or chi-squared statistics.

The best split for a given attribute, as evaluated on the goodness of split measure, is saved for future reference. The search for the best split is repeated for every attribute and the attribute yielding the best overall partition is declared the splitter of the node. The data is then partitioned in accordance with the best split. Some decision trees, such as CART@, split nodes into no more than two child nodes, whereas other decision trees, such as CHAID and C4.5, permit a node to be split into more than two child nodes. Once the root node has been split, the splitting process is repeated separately in each child node, so that the child nodes become parents producing "grand children". The process is repeated again and again until a termination criterion is met. For some decision trees, the termination criterion is a statistical "stopping rule", whereas for others, such as CART®, the splitting process is stopped only when it is not possible to continue, for example, due to running out of data to split, or impractical to continue due to resource limitations such as computing time or disk storage. It is impossible to split a node containing only one instance, or a node all of whose instances have the same value for the target. It may be impractical to split a node containing a small number of instances, for example, fewer than 10. Once a tree has been grown, it may be subjected to a "pruning" process in which some splits at the bottom of the tree are removed to yield a smaller tree containing fewer nodes. Pruning may be applied repeatedly, progressively making the tree smaller, and may be continued until the entire tree is pruned away. The purpose of pruning can be to produce a tree which performs satisfactorily on unseen data or to produce an interpretable tree which can be used as a component of a decision support system.

Turning to FIG. 4, the process by which a prior art decision tree is grown is illustrated. First, appropriate data is made available, including the identification of the target attribute and the eligible splitter attributes, and the current region of the tree is set to zero 410. Once the appropriate data is made available, a search of all available attributes to find the best splitter for every node at the current region is performed 420. If any node at the current region is splittable 430, then the data in such nodes are partitioned, and the region of the tree is incremented by 1 440. If there are no nodes that are splittable at the current region, then the tree growing process terminates 450. The tree generated by this growing process may or may not be the final tree. Some decision tree methods follow the tree growing process by a tree pruning process (C4.5), and some follow the tree growing process by tree pruning, tree testing and selection processes (for example, CART®).

The final decision tree, whether produced by growing only, or by growing and pruning, has the form of a flow chart or decision diagram, as illustrated in FIG. 5. The "root node" appears at the top of the diagram 510 and is the starting point from which the diagram is read. A determination of which child node to proceed to is based on the result of a logical test. In the example shown in FIG. 5, each logical test admits of a "yes" or "no" answer, but tests allowing branches to more than two child nodes are permitted in some decision trees. A record moving to the right arrives at a terminal node at which a prediction or classification is made by the tree 530. A record moving to the left is subjected to another logical test 520 leading either to a terminal node on the left 550 or to another logical test 540. The final logical test leads to the terminal nodes 560 and 570. The decision tree thus reflects a set of ordered logical tests. The terminal at node 570 specifies that if a record satisfies the root node condition on attribute 1, and does not satisfy the condition 520 on attribute 2, and does not satisfy the condition on attribute 3 at 540, then a specific prediction will be made. For regression trees, these predictions will be real numbers, and for classification trees, the predictions may be either class labels (for example, "this record is a responder") or a set of probabilities (for example, "this record is a responder with probability p and a non-responder with probability q), or both class labels and probabilities. The logic displayed in the decision tree is often taken to reveal the underlying causal process by which the outcome is produced.

The predictive model produced by a prior art decision tree may be unsatisfactory for a variety of reasons. First, the decision tree may use splitters in an order which appears to be illogical or contrary to the causal order in which factors are believed to operate. Second, the decision tree may be difficult to understand, and interpret because the causal factors of different types are mixed in what appears to be an arbitrary order. Third, the decision tree may appear to reflect a decision logic that is in conflict with accepted scientific belief or the convictions of experienced decision makers. What is needed is a constrained or structured tree method that controls which attributes may be used as splitters and that specifies the conditions under which an attribute is allowed to act as a splitter or surrogate or alternate splitter.

SUMMARY OF THE INVENTION

It is an object of the present invention to order data in a decision tree.

It is another object of the present invention to control which attributes may be used as splitters in specified regions of a decision tree.

It is yet another object of the present invention to specify conditions under which an attribute is allowed to act as a primary splitter or surrogate or alternate splitter.

The method and system of the present invention allows constraints to be imposed on the induction of decision trees to control where in the decision tree, and in what order, specific attributes may be used as node splitters. The constraints governing where an attribute may be used to split a node can be expressed in terms of: a region or range of regions, a minimum or maximum sample size or sample fraction, cost-complexity or other measure of the gains from splitting a node, absolute position in the tree, position relative to another node or nodes meeting specified characteristics, such as which splitters were used to split those other nodes. The constraints on attributes can also be expressed as being a member of a specified group of attributes or exhibiting certain characteristics described in a database meta-data, such as the attribute's type. The invention thus provides a method for requiring that a certain attribute is used as a splitter in a specified node or nodes, or that the splitter in specified nodes be selected from a specific subset of attributes. The invention also provides a method for preventing an attribute or attributes from being used as the splitter in certain nodes or group of nodes of the tree. The invention may thus be used to force a decision tree to contain a specified attribute in one or more locations, or to require the construction of a decision tree in which nodes split using one group of attributes always appear above or always appear below nodes using another group of attributes. The constrained tree is grown and optionally pruned in the same way that a prior art tree is grown and optionally pruned, subject only to the constraints imposed by the methods of the invention. Constraints may be imposed to improve the usefulness of a decision tree as a decision support mechanism, to enhance a decision tree's comprehensibility, or to force the tree to conform to business logic, causal logic, prior knowledge and beliefs or other requirements. Examples of the application of such constraints include marketing, where one may constrain the decision tree to only use customer characteristics (non-actionable attributes) near the bottom of the tree. In decision trees intended to guide web site personalization systems it may be useful to constrain the upper parts of the tree to attributes of the web site visitor and to constrain the bottom portion of the tree to attributes of the offer or web page presented to the visitor. In bioinformatics, the constraints may require that certain attributes known to be causally related to the target appear first, or in a specific order in the tree.

In the present invention a method and system for ordering data in a decision tree is provided. In the method, training data and a set of attributes, including a target attribute and allowable predictor attributes, are identified. Once identified, the set of attributes are characterized (typically actionable vs. non-actionable) and a determination is made of which of the generally allowable predictor attributes can be used in any node considered for splitting. Then, a search of all the allowed attributes is conducted to find the best splitter for every node in the current region. If any node at the region in question is splittable using permitted attributes, the split is made and the cycle is repeated by incrementing the region by 1. As with all decision trees, tree growing stops if there are no splittable nodes at the region reached.

The foregoing, together with other features and advantages of the present invention, will become more apparent when referring to the following specification, claims and accompanying drawings.

BRIEF DESCRIPTION OF THE DRAWINGS

The present invention will be better understood from the following detailed description of an exemplary embodiment of the invention, taken in conjunction with the accompanying drawings in which like reference numerals refer to like parts and in which:

FIG. 3 illustrates an extract from a sample training data set (or table) appropriately organized for data mining;

DETAILED DESCRIPTION OF THE DRAWINGS

Figure 1:
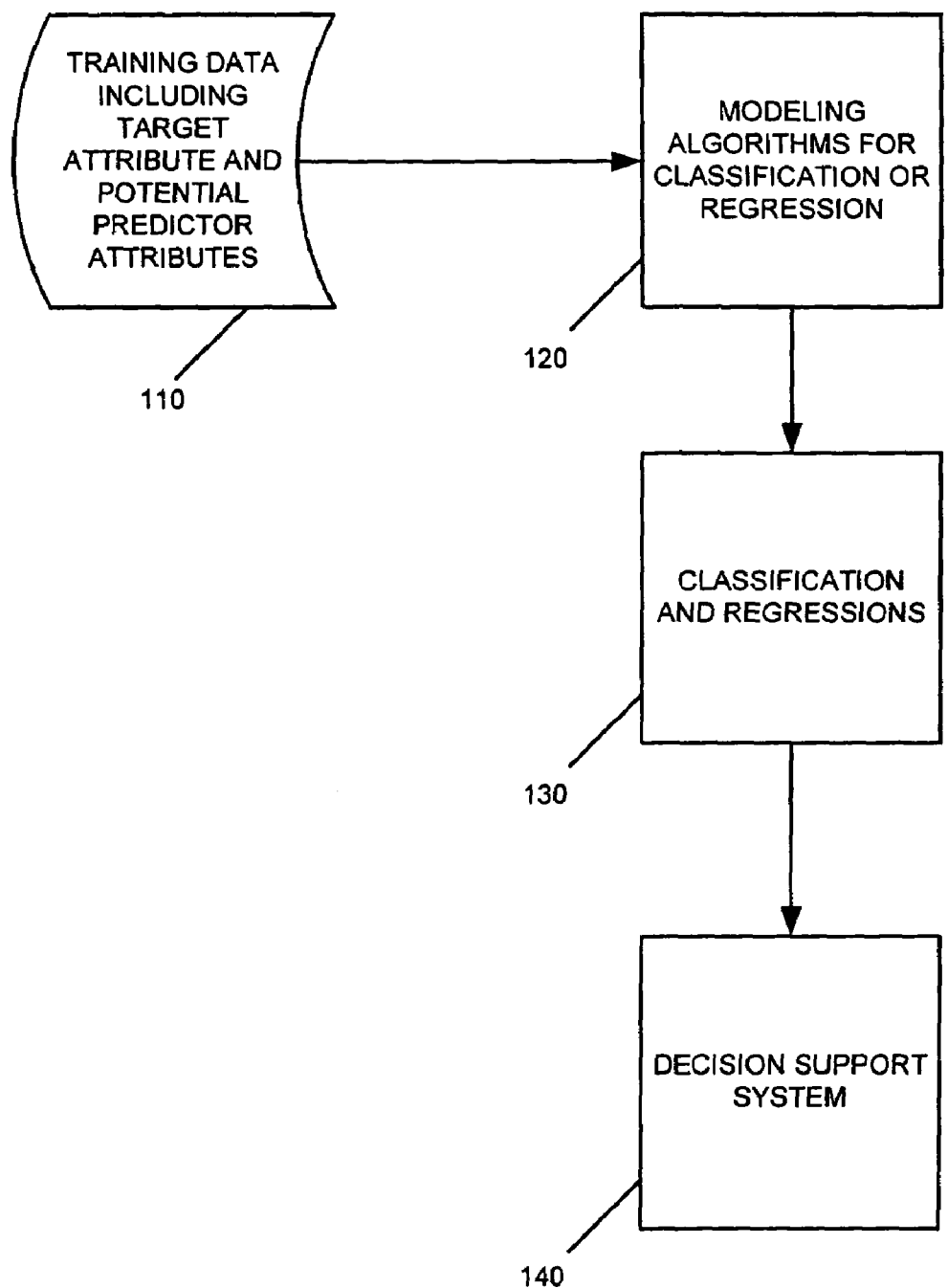
FIG. 1 illustrates a prior art process of the learning of a data mining model.
Figure 2:
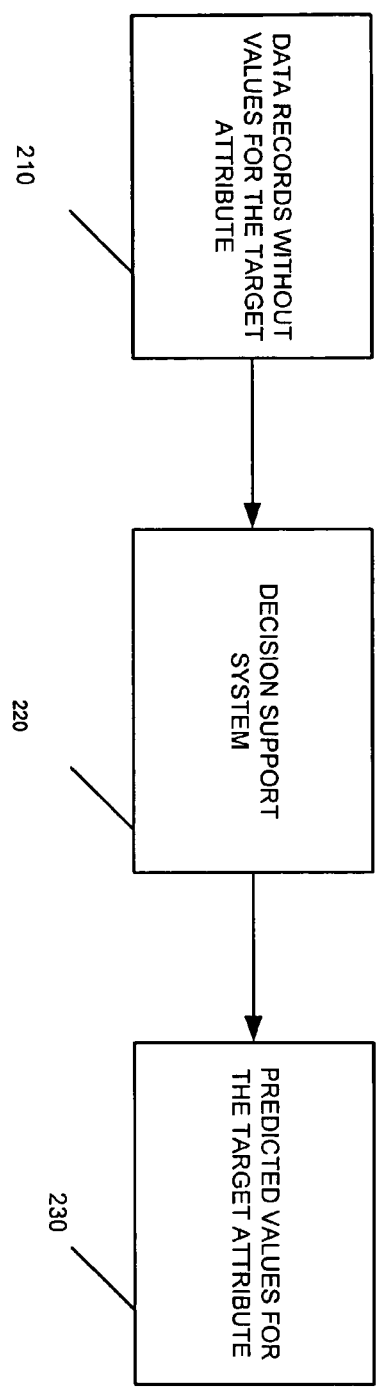
FIG. 2 illustrates a typical use of the decision support system of the prior art.
Figure 4:
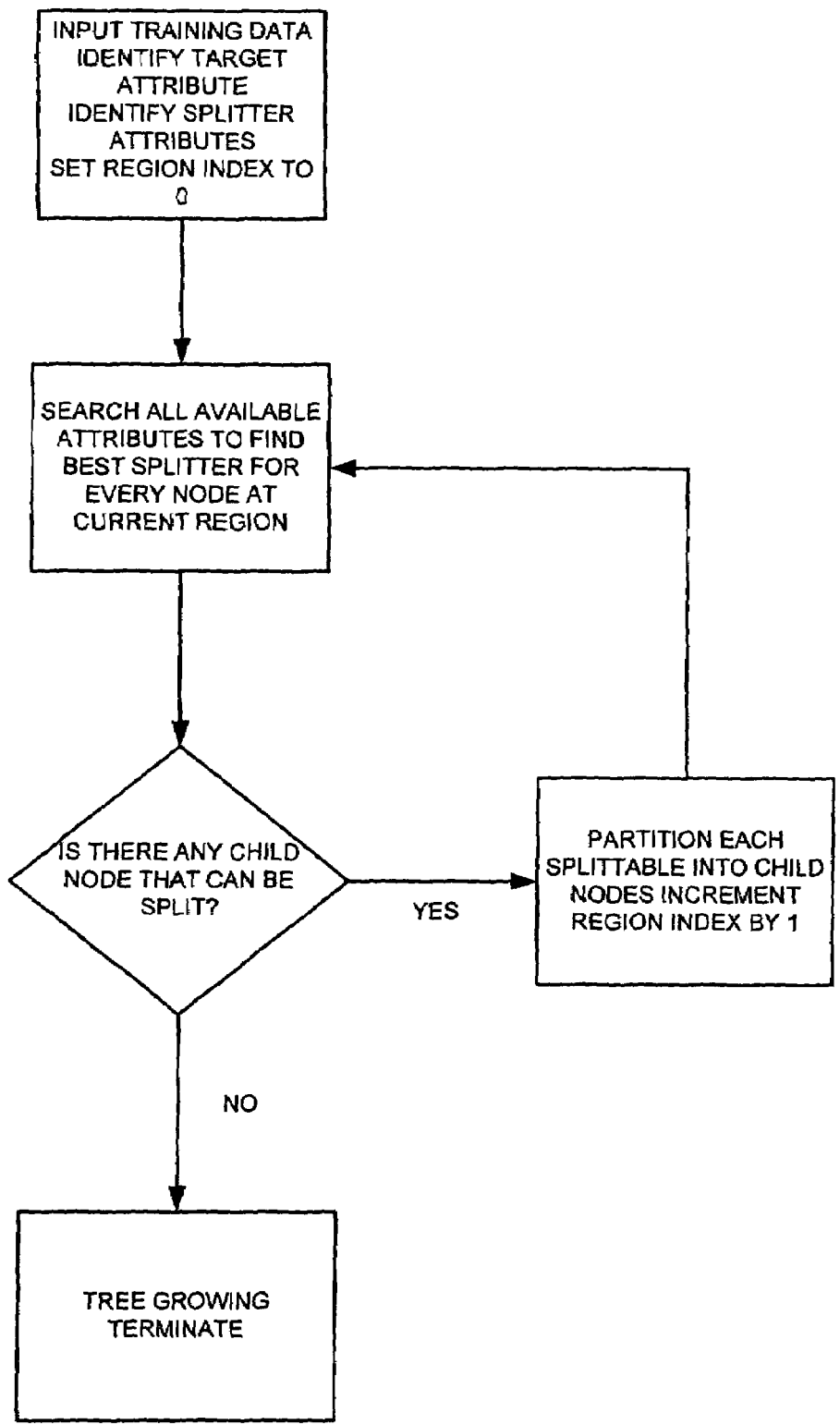
FIG. 4 illustrates the process by which a prior art decision tree is grown.

The present invention provides a method and system for "tree structuring" to control which attributes may be used as splitters in specified regions of a decision tree. As with the prior art method, the first step includes specifying a training data set, target attribute, and allowable splitter attributes. In the present invention, the system requires that characterizations of the splitter attributes be made available, either through meta-data or explicit descriptions. Attributes can be characterized in a broad variety of ways, including but not limited to, database type (numeric, text, date, time, circular), source (which table in a database from which the attribute was drawn, whether the data is internal or external to the organization), cost of acquisition, desirability of inclusion in a model, actionable (under the control of a decision maker), non-actionable (not under the control of a decision maker), stage in a sequential process at which the attribute is relevant, lagged value of the attribute in temporal data, whether the attribute pertains to financial, credit history related, or demographic data, etc. Attributes can also be characterized by orderings, including strict orders in which the attributes are ranked first, second, third, etc. by an analyst, and partial orders in which several attributes are included in a first group but not ordered within the group, and then second, third, and subsequent groups similarly defined. Once the attributes have been characterized, constraints on the tree specified in terms of those characteristics can be stated. Constraints are most conveniently stated in terms of restrictions defining which attributes may be used as primary or alternate splitters in a node. A constraint may be as simple as the requirement that a specific attribute split a specific node. Constraints may also be complex and dictate that certain attributes must be used before others, or that if a node is split by one attribute then its children must be split by some other specific attribute or member of a specified set of attributes, or that an attribute containing the current value of some measure must be used before or after other attributes containing past or lagged values of that same measure.

The locations governed referenced in constraints can also be described in absolute or relative terms and can be stated strictly in terms of attribute characteristics or in terms of tree characteristics. For example, a constraint may be imposed on the root node, or on the root and its immediate right child. Constraints may be imposed in terms of specific regions of the tree. Thus, it might be specified that one group of attributes be used at regions 1, 2, and 3, and that another group of attributes be used at regions 4, 5, and 6, and finally that a third group of attributes be used elsewhere in the tree. Constraints may be stated in terms of sample size, stating that one group of attributes be used for nodes with large samples and another group for the smaller sized nodes. More flexible constraints can be specified in terms of goodness of split. For example, a constraint may specify that so long as a splitter taken from one group of attributes can achieve goodness of split measures that are no worse than 90% of the goodness of split measures of other splitters, then splitters belonging to that first group should be used, but once their performance falls below this threshold alternative attributes are to be used instead.

Figure 5:
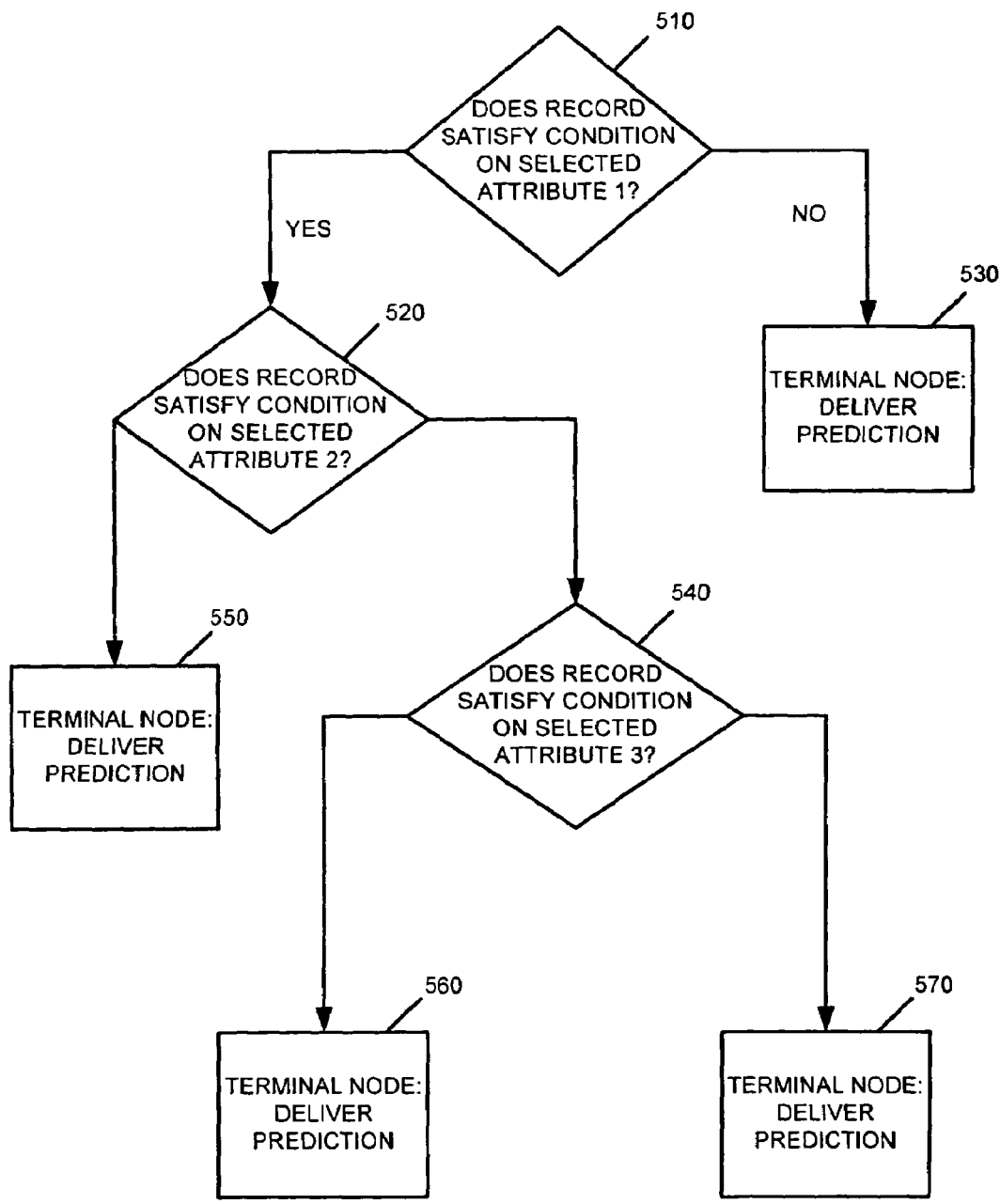
FIG. 5 illustrates a prior art final decision tree in the form of a flow chart or decision diagram.
Figure 6:
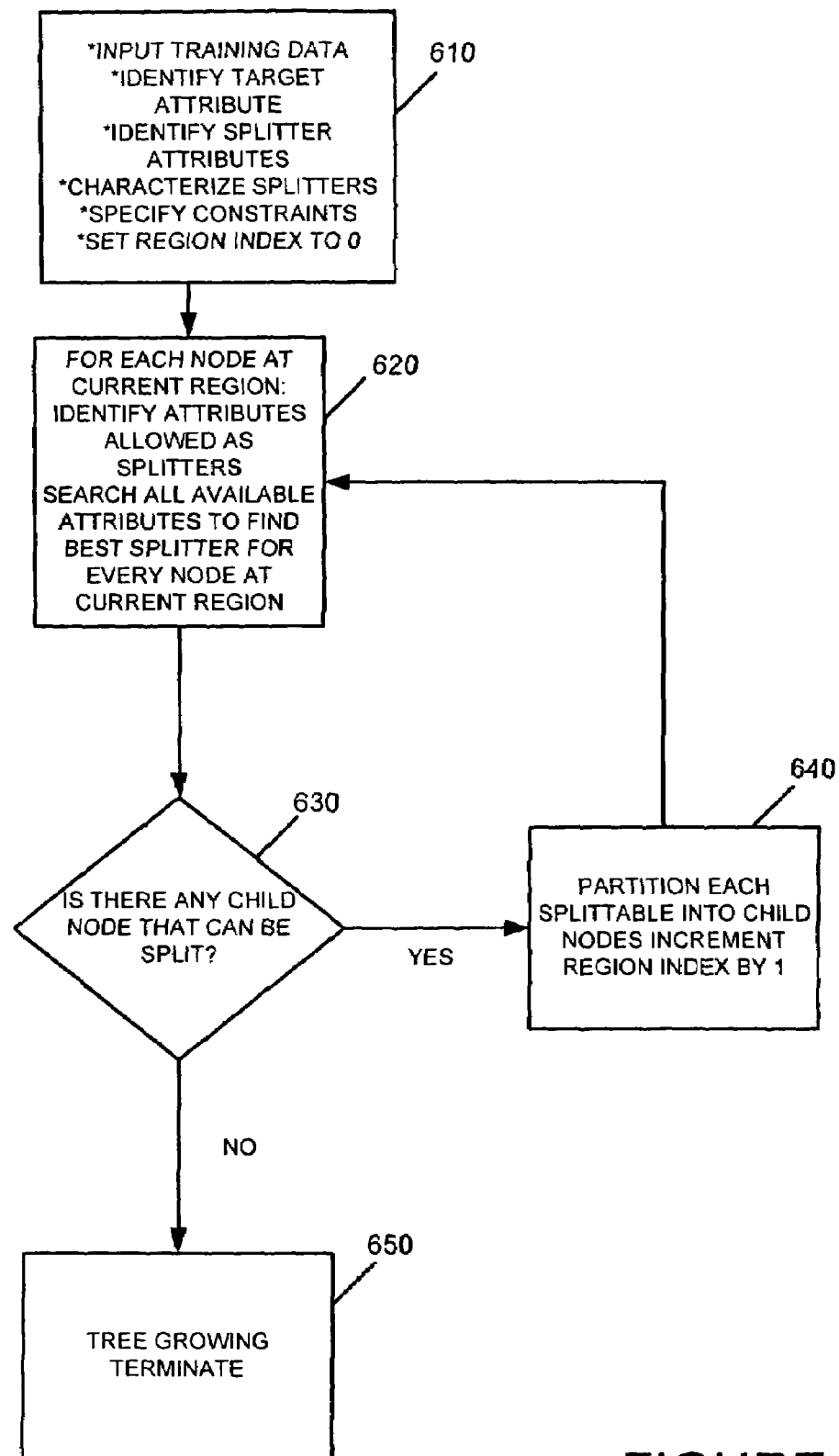
FIG. 6 illustrates a preferred embodiment of the present invention.

FIG. 6 illustrates a preferred embodiment of the present invention. First, the training data, target attribute, and allowable predictor attributes are identified 610. However, unlike the prior art method illustrated in FIG. 5, the method of the present invention includes the characterization of the attributes and the specification of constraints. Next, a determination is made as to which of the generally allowable predictor attributes can be used in any node considered for splitting. Once identified, a search of all the allowed attributes is conducted to find the best splitter for every node in the current region 620. If any node at the region in question is splittable using permitted attributes 630, the split is made 640 and the cycle is repeated. As with all decision trees, tree growing stops if there are no splittable nodes at the region reached.

Constraints can be imposed as a matter of policy governing multiple models, or be tailored to specific models and objectives. Constraints can be beneficial for a number of reasons. If the constraint reflects genuine prior knowledge of the process generating the outcomes measured in the target attribute, it is possible that the resulting models will be more accurate when applied to unseen data. Constraints may reflect the requirements of decision makers to have a decision tree conform to expected business practice, or to reflect a preferred sequence of decisions and tests. Constraints can be imposed to facilitate the tailoring of an offering to a specific customer and to streamline the automation of such tailored offers.

Figure 7:
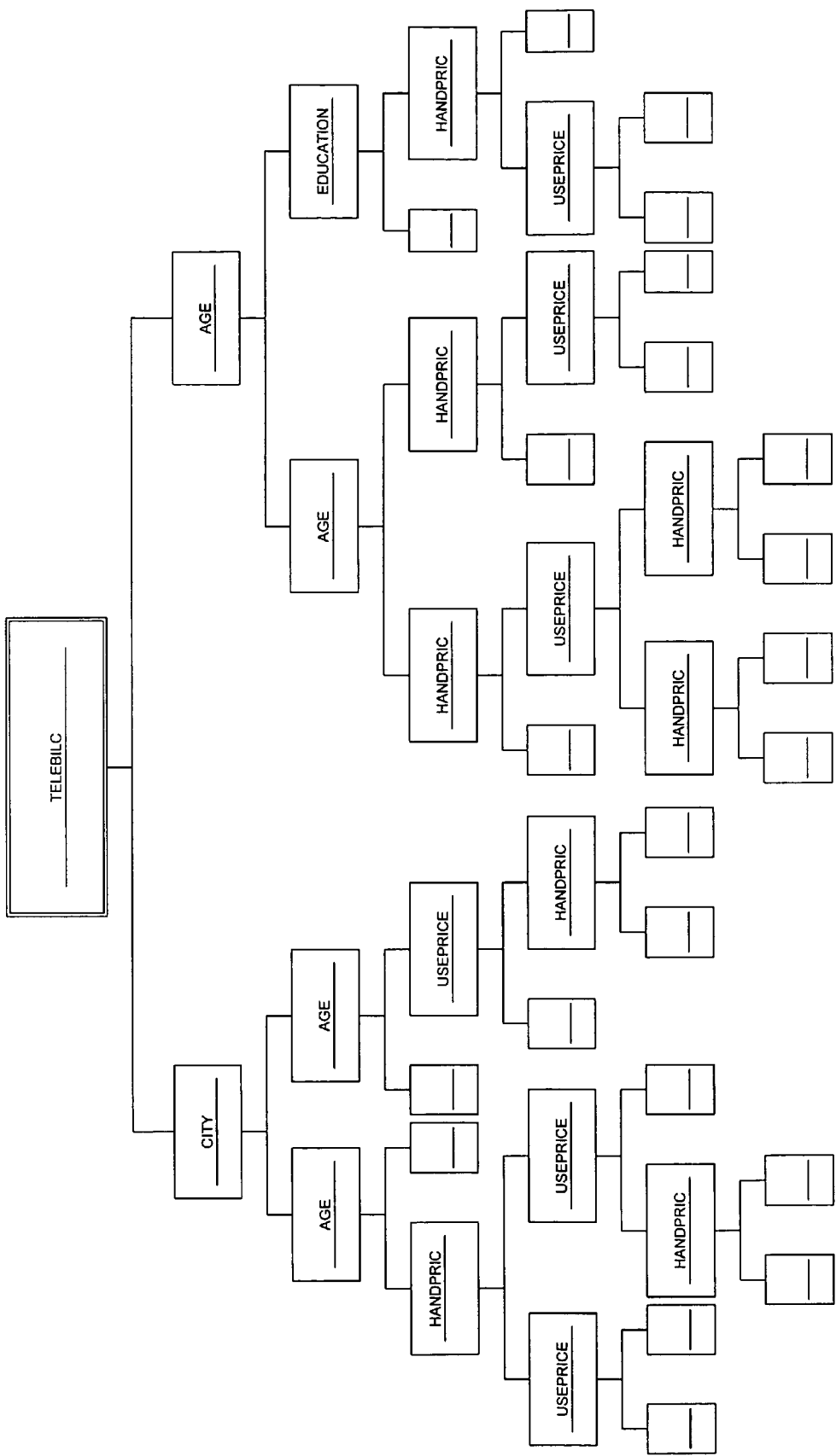
FIG. 7 illustrates a decision tree for predicting a response of the present invention.
Figure 8:
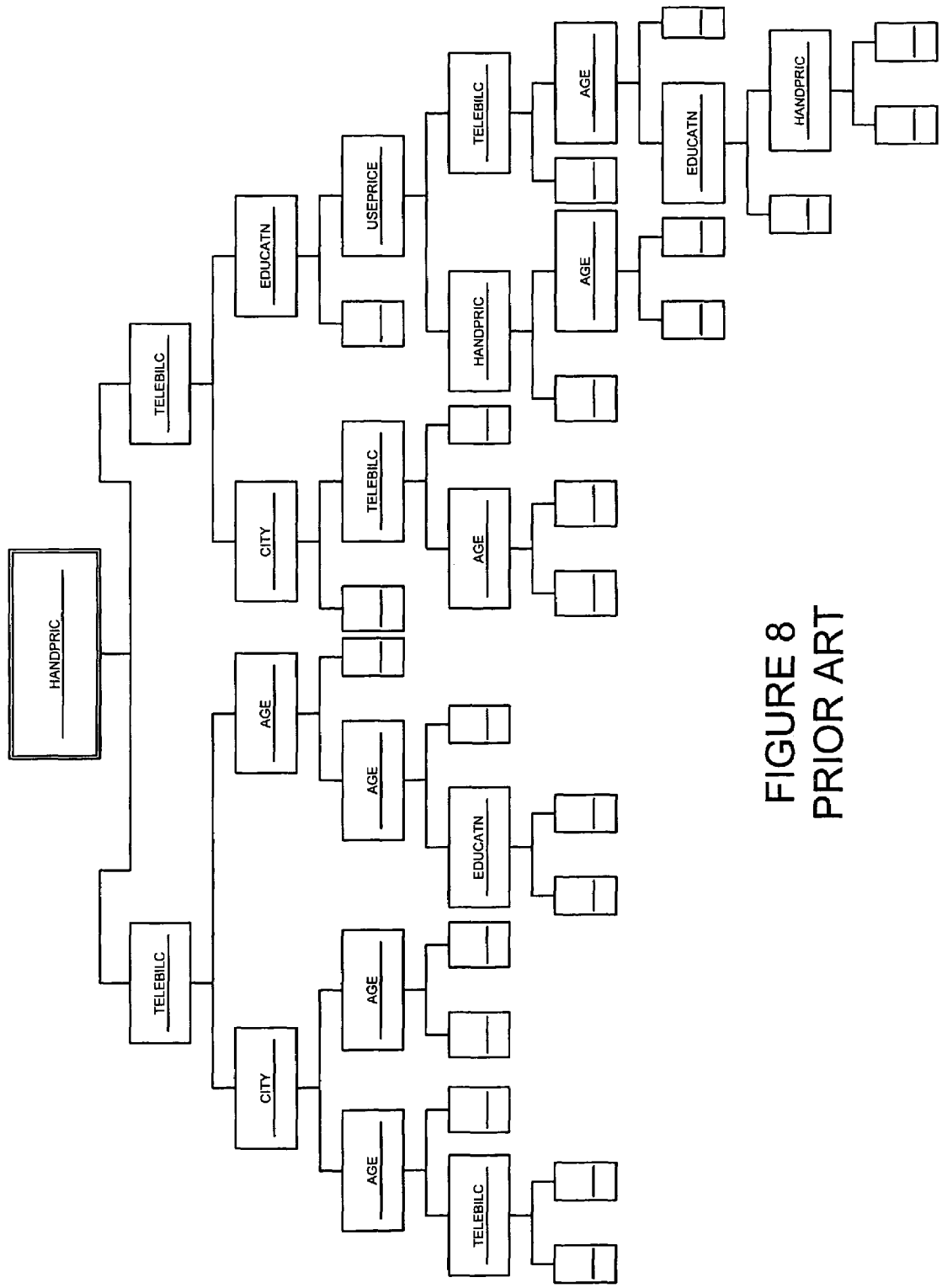
FIG. 8 illustrates a prior art decision tree.

FIGS. 7 and 8 illustrate a comparison of the system of the present invention to the prior art system. The present invention is illustrated in FIG. 7 and the prior art system is illustrated in FIG. 8. Although FIGS. 7 and 8 refer to market research, this is by way of example only and those skilled in the art will recognize that the principles and teachings described herein may be applied to a variety of applications or industries. The examples in FIGS. 7 and 8 utilize a small number of attributes for simplicity. Table 1 below lists these attributes. These attributes are by way of example only. Many other customer and offer attributes could have been listed, including but not limited to, marital status, occupation, calling features such as call waiting, voice messaging and availability of international calling. A main feature of the present invention is being able to separate variables into groups such as actionable and non-actionable and structuring the tree to take this information into account can yield dramatically more useful trees.

TABLE 1

| Attribute | Type | Comment |
|---|---|---|
| HANDPRICE | Actionable | The price of mobile phone handset |
| USEPRICE | Actionable | Per-minute charge for mobile phone usage |
| TELEBILC | Non-actionable | Past 3 months average land line telephone bill |
| AGE | Non-actionable | Age of prospect |
| EDUCATN | Non-actionable | Education level of prospect |
| CITY | Non-actionable | City of residence of prospect |

Referring to FIG. 7, a structured decision tree is illustrated showing a marketing segmentation study based on consumer response to a cell phone offer. The goal is to predict a customer's response to an offer (accept, reject) of a cell phone offer, and predictors include attributes of the offer (hand set price, per minute calling charges) and attributes of the customer (age, city of residence, education, landline telephone bill). Customers in the study were randomly exposed to different pricing plans for the handset and for per-minute usage fees. Segmentations were generated by modeling consumer response (take the offer or not) as a function of consumer and product characteristics. For this type of study, the ideal decision tree may be one in which the upper part of the tree uses customer characteristics (over which the seller has no control) and the bottom part uses attributes controlled by the company (such as price). The tree in FIG. 7 illustrates the functioning of the structure: demographic variables defining segmentation are required by the constraints to appear at the top of the tree. In the lower part of the tree, the tree is completed using only product-pricing characteristics.

The structured tree in FIG. 7 is easier to read than an unstructured tree and tells the user how to price for specific market segments. This is accomplished by putting various demographics, such as TELEBILC (average home phone bill), AGE, and CITY at the top of the tree and utilizing the lower splits in the tree exclusively for the pricing attributes. In the preferred embodiment, low values of a numerical splitter go to the left and high values to go to the right. To make the tree easy to understand and interpret by a user, the nodes of the trees can be color coded to signify specific responses. For example, bright red nodes could signify high response nodes, blue nodes could represent extremely low response nodes, pink could represent a moderately high response and light blue could represent moderately low response. The tree so generated by the current invention may be read as having a section in which potential customers are divided into four mutually exclusive groups, and then a section identifying the offers which are most successful (and least successful) in inducing response. The example displays just one simple analysis embodying the invention; many more complex constraints may be invoked in computer systems using the invention.

The structured tree of the present invention allows useful information to be extracted from a tree even without report details. As can be seen from FIG. 7 (going to the left from the root node, TELEBILC), people with lower home telephone bills who live in specific cites (going left at the CITY split) who are older (going right at the AGE split), their interest in cell phones is so low that even attractive pricing cannot induce response. This is determined because the structured tree method of the present invention does not include any split on a price variable and terminates with a node that indicates that prices are irrelevant to this non-responder group. However, the younger prospects in these cities (those going left on the AGE split) will respond to specific combinations of handset and usage prices. This is seen by looking at the cluster of terminal nodes at the bottom left hand part of the tree by going to the left of the HANDPRIC node. As a result of going to the left, the questions of USERPRICE and HANDPRIC do not have to be responded to, only the question of USERPRICE must be responded to. This structured tree thus tells us how to price for specific market segments. By following a path down the tree to the third region of the tree, a demographic segment defined at least by the size of the home phone bill and age, and possibly city of residence or education as well can be identified. All nodes below the third region are split on pricing variables. Using response rates and price information, it is easy to calculate the maximum profit nodes.

If the tree in FIG. 7 have been grown in the conventional way (unconstrained) it would have started using the handset price at the very top of the tree. FIG. 8 illustrates the unstructured decision tree analysis of the same data used in FIG. 7. The tree in FIG. 8 tells a story similar to the tree in FIG. 7, but is it much harder to read and interpret because prices are intermixed with demographics and reverse engineering the optimal price for a specific segment requires considerable effort. In this prior art example, only a half a dozen variables were used so as to simplify the example. In more complex real world analyses, the differences between structured and unstructured trees can be far more dramatic because trees can be structured in many different ways. For example, there could be several different regions with each constructed from a different set of variables. These regions can be ordered as required by the specific problem that is being described in terms of a decision tree. In the example in FIG. 7, the tree is structured by requiring that the variables under the user's control appear at the bottom of the tree and be the final splitters. In some circumstances it may make sense to structure the tree using the reverse ordering, with controllable variables at the top and uncontrollable variables at the bottom.

In FIG. 8, the first level of the tree uses an offer attribute to split the root node (NUMBER), the second and third regions use customer attributes (NUMBER), while at the fourth region some nodes are split by customer attributes and some by offer attributes. On the other hand, FIG. 7 displays the results of analyzing the same data using the current invention with the imposition of the constraint that at regions 1, 2 and 3 only customer attributes may be used as splitters. In this example, the top of the tree is generated by using splits on unactionable prospect attributes, and the splits are generated using only these attributes until certain conditions are met (in this case, reaching a certain region in the tree). Then, the tree is completed using an alternate set of attributes (in this example, offer attributes under the control of the marketer).

Although an exemplary embodiment of the invention has been described above by way of example only, it will be understood by those skilled in the field that modifications may be made to the disclosed embodiment without departing from the scope of the invention, which is defined by the appended claims.

We claim:

1. A computer implemented method of ordering data on a computer useable medium in a decision tree, the method comprising the steps of:
   a. identifying training data;
   b. identifying a set of attributes, the set of attributes comprising:

a target attribute; and
allowable predictor attributes;
c. characterizing the set of attributes;
d. specifying constraints on the decision tree in terms of the characterized set of attributes;
e. determining which allowable predictor attributes satisfy the constraints at a node of the decision tree;
f. determining the best splitter among the allowable predictor attributes that satisfy the constraints at said node of the decision tree;
g. splitting all of the splittable nodes at a region of the decision tree using said best splitter;
h. incrementing the region of the decision tree by 1;
i. repeating steps e through h until there are no splittable nodes remaining; and
j. storing the data as a decision tree on a computer readable medium.

2. The method of claim 1, further comprising the step of partitioning each of the splittable nodes into child nodes.

3. The method of claim 2, wherein the child nodes are color coded to signify specific responses.

4. The method of claim 1 wherein the constraints are restrictions that define which attributes in the set of attributes are used as primary splitters and which are used as surrogate splitters in the nodes of the decision tree.

5. The method of claim 4 wherein the constraints dictate that certain attributes must be used first.

6. The method of claim 5, wherein constraints are imposed on specific regions of the decision tree.

7. The method of claim 5, wherein constraints are imposed on a root node.

8. The method of claim 2, wherein going to the right of said each of the splittable nodes represents a high value; and
wherein going to the left of said each of the splittable nodes represents a low value.

9. The method of claim 1, wherein the set of attributes are characterized by a group consisting of database type, source, cost of acquisition, desirability of inclusion in a mode, actionable and non-actionable.

10. A computer program comprising a computer useable medium having a computer readable program code embodied in the medium for causing a computer processor to execute the steps of:
a. identifying training data;
b. identifying a set-of attributes, the set of attributes comprising:
i. a target attribute; and
ii. allowable predictor attributes;
c. characterizing the set of attributes;
d. specifying constraints on the decision tree in terms of the characterized set of attributes;
e. determining which of the allowable predictor attributes can be used in nodes of the decision tree for splitting at a region of the decision tree;
f. determining the best splitter from the allowable predictor attributes that can be used in a specific node of the decision tree for splitting at the region;
g. splitting any of the nodes at the region if said any of the nodes are splittable;
h. incrementing the region of the decision tree by 1; and
i. repeating steps e through h until there are no splittable nodes remaining.

11. A system for ordering data in a decision tree, comprising: a computer useable medium containing the data to be ordered, computer useable memory, a processor, and processor-executable instructions for ordering the data into a decision tree, the instructions directing the processor to: identify training data and a set of attributes on the computer useable medium, characterize the set of attributes, specify constraints on the decision tree in terms of the characterized set of attributes, determine which of the set of attributes satisfy the constraints determine the best splitter among the attributes that satisfy the constraints, and splitting any of the nodes at the region that are splittable.

12. The system of claim 11, wherein the set of attributes comprises
a target attribute; and
allowable predictor attributes.

13. The system of claim 12, wherein the allowable predictor attributes are used in the nodes for splitting at a region; and
wherein a best splitter from the allowable predictor attributes are used for splitting at the region.

14. The system of claim 13, wherein the region of the decision tree is incremented by 1 until there are no splittable nodes remaining.

15. The system of claim 11, wherein the decision tree partitions each of the splittable nodes into child nodes.

16. The method of claim 11, wherein constraints on the decision tree are specified in terms of the characterized set of attributes; and
wherein the constraints are restrictions that define which attributes in the set of attributes may be used as primary and alternate splitters in the nodes of the decision tree.

17. The method of claim 16 wherein the constraints dictate that certain attributes must be used first.

18. The method of claim 17, wherein constraints are imposed on specific regions of the decision tree.

19. The method of claim 18, wherein constraints are imposed on a root node.

20. The method of claim 14, wherein going to the right of said each of the splittable nodes represents a high value; and
wherein going to the left of said each of the splittable nodes represents a low value.

* * * * *